United States Patent
Bharadwaj et al.

(10) Patent No.: US 9,847,943 B2
(45) Date of Patent: *Dec. 19, 2017

(54) TECHNIQUE FOR MITIGATING EFFECTS OF SLOW OR STUCK VIRTUAL MACHINES IN FIBRE CHANNEL COMMUNICATIONS NETWORKS

(71) Applicant: CISCO TECHNOLOGY, INC., San Jose, CA (US)

(72) Inventors: Harsha Bharadwaj, Bangalore (IN); Prabesh Babu Nanjundaiah, Tumkur (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/456,917

(22) Filed: Mar. 13, 2017

(65) Prior Publication Data

US 2017/0187627 A1    Jun. 29, 2017

Related U.S. Application Data

(63) Continuation of application No. 14/733,728, filed on Jun. 8, 2015, now Pat. No. 9,608,909.

(51) Int. Cl.
*H04L 12/803* (2013.01)
*H04L 12/26* (2006.01)
*H04L 12/801* (2013.01)

(52) U.S. Cl.
CPC ........ *H04L 47/122* (2013.01); *H04L 43/0858* (2013.01); *H04L 47/11* (2013.01)

(58) Field of Classification Search
None
See application file for complete search history.

(56) References Cited

U.S. PATENT DOCUMENTS

| | | |
|---|---|---|
| 8,498,213 B2 | 7/2013 | Gnanasekaran et al. |
| 8,542,583 B2 | 9/2013 | Gnanasekaran et al. |
| 8,588,075 B2 | 11/2013 | Gnanasekaran et al. |
| 8,593,965 B2 | 11/2013 | Rongong et al. |
| 8,599,691 B2 | 12/2013 | Gnanasekaran et al. |
| 8,767,561 B2 | 7/2014 | Gnanasekaran et al. |
| 8,792,354 B2 | 7/2014 | Gnanasekaran et al. |
| 8,908,525 B2 | 12/2014 | Gnanasekaran et al. |
| 9,608,909 B1 | 3/2017 | Bharadwaj et al. |

(Continued)

*Primary Examiner* — Hong Cho
(74) *Attorney, Agent, or Firm* — Polsinelli PC

(57) ABSTRACT

A method is provided in one example embodiment and includes monitoring an egress port connected to a server to detect a traffic flow comprising a plurality of data packets and determining whether one of the packets is timeout dropped at the egress port. If at least one of the packets is timeout dropped at the egress port, the method further includes detecting a destination identifier ("DID") of the timeout dropped packet and withdrawing a device identified by the detected DID from an FC zone to which it is assigned and reactivating the zone. The method further includes determining whether the traffic flow is experiencing high wait times at the egress port and, if the traffic flow is experiencing high wait times at the egress port, detecting the DID of the traffic flow and reducing a priority of the zone to which the detected DID is assigned and reactivating the zone.

20 Claims, 4 Drawing Sheets

(56) References Cited

U.S. PATENT DOCUMENTS

| | | |
|---|---|---|
| 2005/0108444 A1* | 5/2005 | Flauaus ............... H04L 41/0853 710/15 |
| 2006/0190611 A1* | 8/2006 | Miyazaki .............. G06F 3/0605 709/229 |
| 2011/0110232 A1* | 5/2011 | Abraham ............ H04L 41/5025 370/235 |
| 2013/0343186 A1 | 12/2013 | Gnanasekaran et al. |
| 2014/0056147 A1* | 2/2014 | Gnanasekaran ........ H04L 49/15 370/235 |
| 2014/0086054 A1 | 3/2014 | Rongong et al. |

* cited by examiner

TECHNIQUE FOR MITIGATING EFFECTS OF SLOW OR STUCK VIRTUAL MACHINES IN FIBRE CHANNEL COMMUNICATIONS NETWORKS

PRIORITY DATA

This application is a continuation (and claims the benefit of priority under 35 U.S.C. §120) of U.S. application Ser. No. 14/733,728, filed on Jun. 8, 2015, entitled "TECHNIQUE FOR MITIGATING EFFECTS OF SLOW OR STUCK VIRTUAL MACHINES IN FIBRE CHANNEL COMMUNICATIONS NETWORKS," Inventors Harsha Bharadwaj et al. The disclosure of the prior application is considered part of (and is incorporated by reference into) the disclosure of this application.

TECHNICAL FIELD

This disclosure relates in general to the field of fibre channel communications networks and, more particularly, to techniques for mitigating effects of slow or stuck virtual machines ("VMs") in such networks.

BACKGROUND

Fibre Channel ("FC") network is a no-drop network that operates on a credit-based flow control mechanism for communication between any pair of ports. A buffer-to-buffer ("B2B") credit number for a peer port tracks the number of packet buffers available on a peer port for packet transmission toward that port. An FC packet may be transmitted by a port only if it has B2B credit at the peer port that is greater than zero. A packet transmitted from a port decrements the B2B credit counter. An acknowledgement of completion of processing of a packet takes the form of a Receiver Ready ("R_RDY") primitive signal from the peer port, which increments the B2B credit counter. The R_RDY primitive only contains information that a buffer is available at the port sending R_RDY and no other information.

A "slow drain device" is a device that does not accept frames at the rate generated by a source; i.e., the R_RDYS are delayed in response to the frames. A "stuck device" is a device that has completely stopped accepting frames from a source; i.e., the R_RDYs are not returned in response to frames. In the presence of slow or stuck devices, FC networks are likely to run out of switch packet buffers, resulting in switch port credit starvation and potential choking of Inter-Switch Links ("ISLs"). An ISL running out of B2B credits results in traffic flows unrelated to the slow drain/stuck device being impacted, due to head-of-line blocking. A slow drain/stuck device condition can arise due to problems in the server Operating System ("OS") or host bus adapters ("HBAs"), storage issues, switch misconfigurations (e.g., speed mismatches), among other issues. Many cases involving slow drain devices are due to servers being overwhelmed by large chunks of data being received from a storage device. For example, large storage area network ("SAN") installations face this problem on a daily basis and may fence off the ports that are deemed to be slow drain ports (e.g., 25-30 ports per day).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes monitoring an egress port connected to a server to detect a traffic flow comprising a plurality of data packets and determining whether one of the packets is timeout dropped at the egress port. If one of the packets is timeout dropped at the egress port, the method further includes detecting a destination identifier ("DID") of the timeout dropped packet and withdrawing a device identified by the detected DID from an FC zone to which it is assigned and reactivating the FC zone. The method further includes determining whether the traffic flow is experiencing high wait times at the egress port and, if the traffic flow is experiencing high wait times at the egress port, detecting the DID of the traffic flow and reducing a priority of the FC zone to which the detected DID is assigned and reactivating the FC zone.

In some embodiments, if one of the packets is timeout dropped at the egress port, the identified device is deemed a stuck device. Additionally, if the traffic flow is experiencing high wait times at the egress port, the identified device is deemed a slow device. The method may further include, if one of the packets is not timeout dropped at the egress port, determining whether the identified device was previously deemed a stuck device; and if the identified device was previously deemed a stuck device, notifying an administrator. The method may also include, if the traffic flow is not experiencing higher wait times at the egress port, determining whether the identified device was previously deemed a slow device; and, if the identified device was previously deemed a slow device, upgrading the priority of the FC zone to an original value and reactivating the FC zone. In certain embodiments, the identified device comprises a virtual machine hosted on the server identified by a DID. In other embodiments, the virtual machine is identified by the DID and a proprietary tag in in the FC header.

Example Embodiments

Figure 1A:
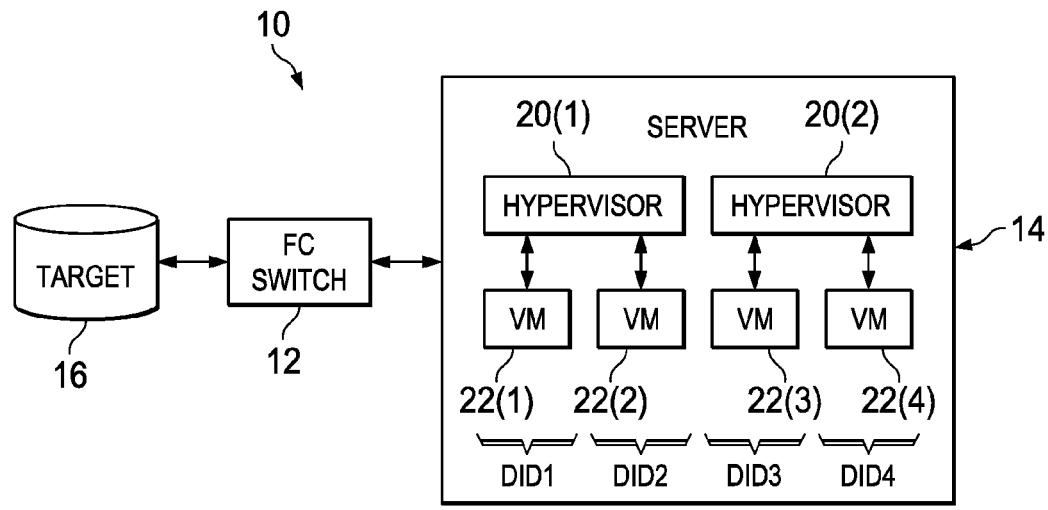
FIG. 1A is a simplified block diagram of an FC network environment in which a technique for mitigating the effects of slow drain or stuck VMs in accordance with embodiments described herein may be implemented.

Turning to FIG. 1A, illustrated therein is a simplified block diagram of an FC network 10 in which embodiments described herein for mitigating the effects of slow and stuck VMs using zone QoS techniques may be implemented. As shown in FIG. 1A, the network 10 includes an FC switch 12 interconnecting a server 14 to a target 16, which in the illustrated embodiment comprises a SAN device. A single I/O connection 18 is provided between the FC switch 12 and the server 14. Hypervisors 20(1) and 20(2) running on the server 14 instantiate a plurality of VMs 22(1)-22(4) for performing various tasks. Each VM logs into the switch and receives an FCID for communications in the SAN. In one embodiment, the FC switch 12 is implemented using an MDS 9000 series switch available from Cisco Systems, Inc., of San Jose, Calif. Some FC switches, including the aforementioned MDS 9000 series switches, include certain mechanisms for identifying slow drain devices. Such mechanisms may include tracking an amount of time spent waiting for credits (B2B=0) on a port with a configurable timeout threshold (100 ms). Employing this mechanism, once the wait time for a frame on a port exceeds the designated threshold, the connected device is deemed slow drain or stuck. The device is then quarantined form the network by configuring port monitor policies with such actions as Link Reset, Link Flap, Error Disable Port, Drop All Packets, etc.

Traffic in an FC network can be optionally classified at switch ingress ports as "low," "normal," or "high" priority using QoS configurations. Classified frames are then arbitrated and queued inside the switch based on the QoS priority. The QoS priority marked on the packets is carried across ISL links provided receiving port is classified as a Trunking E port ("TE_port").

In storage networking, FC zoning is an access control mechanism that specifies devices that can communicate with each other. Basically, FC zoning is the partitioning of an FC fabric into smaller subsets to restrict interference, add security, and simplify management. While a SAN makes available to a single device several devices and/or ports, each system connected to the SAN should only be allowed access to a subset of those devices and/or ports. Zoning also provides a priority attribute per zone that assigns priority to all the traffic among the zone members to one of the three QoS levels. This tying together of QoS attribute into the zone allows specification of traffic priority in a familiar data flow identification paradigm. Typical zones pair servers with storage and are configured using a worldwide name ("WWN") of the FC device. By default, all zones are initially designated to have a "normal" priority.

As previously noted, the R_RDY primitive does not indicate for which class of traffic a buffer is available. For this, a proprietary enhanced version of R_RDY called Extended R_RDY ("ER_RDY") is implemented in certain FC switches, such as the above-mentioned MDS 9000 series switches, to return credits per class value (e.g., up to 8 class values) on an FC link. This feature enables virtual partitioning of B2B credits on a physical link per class of traffic and accounts and also returns B2B credits as ER_RDYs per class. This feature works only on ISLs among certain types of switches (e.g., MDS 9000 series switches) and may not be enabled on edge ports ("F_ports") connecting to end devices.

In summary, current mechanisms for handling slow drain/stuck devices involve two steps. First, problematic devices are identified using pure software or ASIC assisted mechanisms. Next, the device connected switch port is fenced by policies like dropping all traffic, flapping the port, or (for persistently problematic devices) disabling the port. Fencing the device results in all frames from and to the device eventually being dropped from the edge ports, ISLs, etc., while traffic to other devices in the FC network remains unaffected. This solution is generally acceptable in a scenario in which only one device is connected to a switch port. However, with the advent of server virtualization, several virtual machines ("VMs") may be implemented on a single physical server managed by a hypervisor, resulting in all of those VMs sharing the same physical I/O connection into a SAN. The hypervisor multiplexes individual VM disk I/Os before sending them to the FC network on a single port. This presents a problem when one of the many VMs begins exhibiting slow drain/stuck device conditions. Currently available solutions, such as those described above, are not suited for this scenario, as physical port level actions penalize all VMs hosted on the server, which is clearly not acceptable. For example, referring again to FIG. 1A, assuming VM 22(4) is exhibiting slow/stuck conditions, current solutions would result in traffic of all of VMs 22(1)-22(4) being penalized because all of the VMs are behind the same port of FC switch 12.

Figure 2:
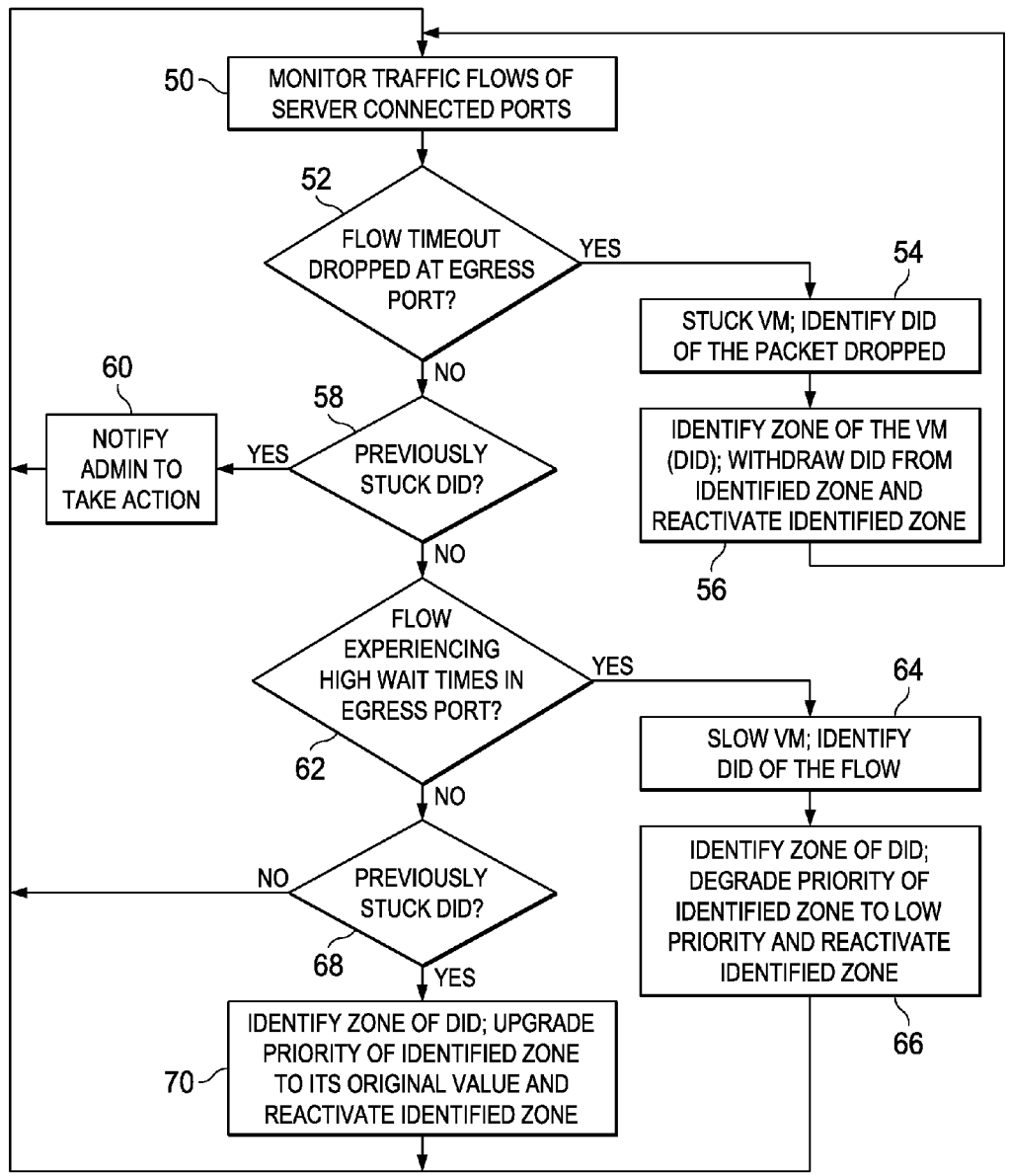
FIG. 2 is a flowchart illustrating example operation of a technique for mitigating the effects of slow drain or stuck VMs in accordance with embodiments described herein.

Solving the problem of fencing only specific VMs (e.g., VM 22(4) in the above example) behind a switch port first requires a mechanism to identify a flow (and hence, a VM) that is exhibiting a slow or stuck condition behind a port. Once such a flow is identified, a mechanism must be provided that penalizes only the traffic from the identified VM once it enters the FC network. Referring to FIG. 2, illustrated therein is a flowchart of operation of an embodiment for mitigating the effects of slow and stuck VMs in an FC network using FC zone QoS techniques. In step 50, traffic flows at each server connected port of an FC switch (such as FC switch 12) are monitored. It will be noted that identification of VMs that are slow/stuck requires the ability to identify and distinguish slow and stuck traffic flows separately. A stuck device results in frames destined to the device being timeout dropped after waiting at the egress queue of the switch port. Accordingly, in step 52, a determination is made whether a flow timeout is dropped at the egress port of the switch. If so, execution proceeds to step 54, in which the VM associated with the flow is deemed to be "stuck" and a destination of the flow is determined by parsing the destination identification ("DID") of the dropped packets. By parsing the destination identification ("DID") of the frames that are timeout dropped, the stuck DID can be identified. In step 56, the zone of the VM identified by the DID is identified as a "stuck zone" in which quarantine action needs to be taken. In one embodiment such quarantine action includes withdrawing the stuck VM from the zone so that traffic to the stuck VM ceases and traffic to the remaining VMs continues. Execution then returns to step 50.

If a negative determination is made in step 52, execution proceeds to step 58, in which a determination is made whether the identified DID is one that has been previously stuck. If so, in step 60, the network administrator is notified that action needs to be taken and execution returns to step 50.

A slow device would mean that frames destined to it are exhibiting higher wait times in egress queues. Accordingly, if a negative determination is made in step 58, execution proceeds to step 62, in which a determination is made whether the flow is experiencing higher wait times in the egress port. If so, execution proceeds to 64, in which the VM associated with the flow is deemed to be "slow" and the destination of the flow is determined by parsing the DID of the flow. In step 66, the zone of the VM identified by the DID is identified as a "slow zone." As a result, a QoS priority attribute of the zone may be modified to "low." These changes in zoning configuration are then auto-reactivated in the fabric. In accordance with embodiments described herein, the low QoS priority attribute has a minimal deficit weighted round robin ("DWRR") weight associated with it in the packet scheduler at the egress port queue in the ASIC. Since the active zoning database is a distributed database, the change propagates to the entire network and the low priority is marked into all the packets involving the flows at the point of entry into the network. The priority is also carried on the ISLs where the ER_RDY mechanism discussed earlier is enabled. The low priority traffic on the ISL has very minimal B2B credits reserved, which ensures that all other flows with normal and high priority are not head-of-line blocked by the low priority flow. This degradation of the priority network-wide will cause the traffic from and to the VM to be reduced to a minimum. All other VM traffic which is running at normal priority is not impacted by the slow/stuck VM. Upon completion of step 66, execution returns to step 50.

If a negative determination is made in step 62, execution proceeds to step 68, in which a determination is made whether the VM identified by the DID had been previously identified as a slow DID. If so, execution proceeds to step 70, in which the priority of zone of the identified VM is upgraded to its original value and the zone is reactivated. Execution then returns to step 50.

By periodically polling egress queues on the switch port and calculating the average wait time of frames the "top-n-high-wait-flows" can be determined. Both drop and high wait flows can be implemented either purely in software or using an ASIC assisted mechanism. In addition to the DID, the source identification ("SID") of the flows would indicate the targets with which the slow/stuck VMs are communicating. An end result of this identification process are the {SID, DID} pairs of slow/stuck devices.

Figure 1B:
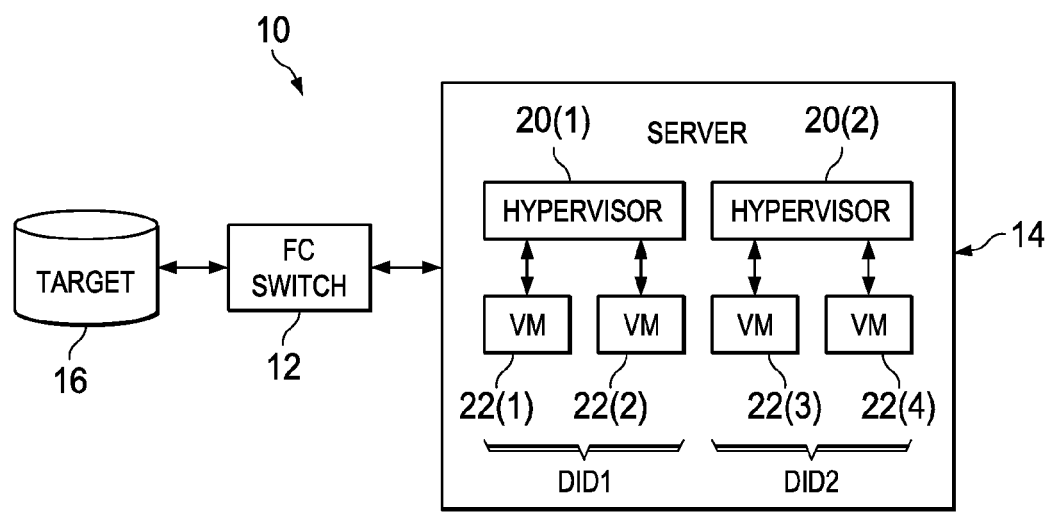
FIG. 1B is a simplified block diagram of an alternative configuration of an FC network environment in which a technique for mitigating the effects of slow drain or stuck VMs in accordance with embodiments described herein may be implemented.

In an alternative configuration, as illustrated in FIG. 1B, all of the VMs behind a hypervisor share the same DID and use another proprietary tag to identify the VM. In such cases, embodiments described herein may be extended to cover these cases on an {DID, tag} basis. The tag concept may be extended to zone QoS as well.

While ASIC embedded solutions are the best and most accurate for this identification, in ASICs that don't support this solution, a software polling based mechanism can be employed, which also can be reasonably accurate. Once a slow/stuck VM is identified, an active zoning database on the switch is queried to determine all the zones that are configured with the {SID, DID} pairs. Since zoning is typically performed in device WWN format, a Name Server query can be executed to map the device FC identification ("FCID") to its WWN. It is highly desirable that zoning be configured such that each {VM, target} pair is configured as a separate zone, which gives more granular control with respect to the policy that will be applied for a VM/target pair. Once such zones are identified, they are further classified as stuck and slow zones.

As previously noted, in all of the stuck zones, quarantine action needs to be taken. In one embodiment such quarantine action includes withdrawing the VM from the zone so that traffic to the VM ceases. In all of the slow zones, the QoS priority attribute may be modified to "low." These changes in zoning configuration are then auto-reactivated in the fabric. In accordance with embodiments described herein, the low QoS priority attribute has a minimal deficit weighted round robin ("DWRR") weight associated with it in the packet scheduler at the egress port queue in the ASIC. Since the active zoning database is a distributed database, the change propagates to the entire network and the low priority is marked into all the packets involving the flows at the point of entry into the network. The priority is also carried on the ISLs where the ER_RDY mechanism discussed earlier is enabled. The low priority traffic on the ISL has very minimal B2B credits reserved, which ensures that all other flows with normal and high priority are not head-of-line blocked by the low priority flow. This degradation of the priority network-wide will cause the traffic from and to the VM to be reduced to a minimum. All other VM traffic which is running at normal priority is not impacted by the slow/stuck VM.

A stuck VM usually will not recover in its own and may require server administrator intervention and reactivation of the zone in which the VM is included after troubleshooting and rectification of the issue at the server (step 60). A slow VM might be displaying only momentary slowness. For this reason, the monitoring of the egress queue may continue for all the flows identified as slow. If a slow VM continues to drain at a slow rate for an extended period of time, the administrator can be notified so that further troubleshooting or quarantine of the VM can be undertaken by the server administrator. On the other hand, if a slow VM shows signs of recovery by not dropping frames or average wait time for the low priority traffic, the QoS priority attribute of the zone can be reset to its original value (step 70). This provides an auto-recovery mechanism for a slow VM to resume normal I/O activity. While this solution is described for VMs, same solution can be extended for standalone servers also for a uniform solution for both cases.

The effects of slow and stuck VMs on other devices in an FC network may be minimized using embodiments described herein. QoS priority of a slow VM is downgraded as long as it exhibits abnormal behavior and is automatically upgraded once it resumes its normal behavior. Benefits of the techniques described herein include that VMs behind a switch port that are not slow/stuck are not impacted due to other slow/stuck VMs behind the same switch port, ISL links not head-of-line blocked by slow/stuck VMs, slow VMs are not taken out of the network but are permitted to continue operation at a slower I/O rate. Additional benefits include that no administrator intervention required to monitor a slow VM since the VM can auto-correct and an administrator may be notified about a stuck VM as well as the target it was accessing when it got stuck. Moreover, temporary slow drain conditions in a VM is auto-recovered without the VM having to undergo a reset to get back to normal operation and only the {VM, target} pair exhibiting slowness is penalized. If slowness is due to a target issue, other targets that the VM may be accessing, if zoned separately, are not impacted.

Figure 3A:
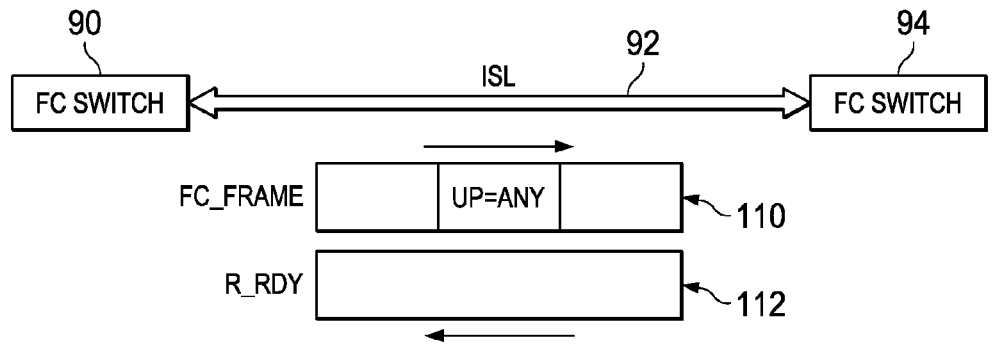
FIGS. 3A and 3B respectively illustrate operation of an R_RDY mechanism and an Extended R_RDY ("ER_RDY") mechanism as related to a technique for mitigating the effects of slow drain or stuck VMs in accordance with embodiments described herein.
Figure 3B:
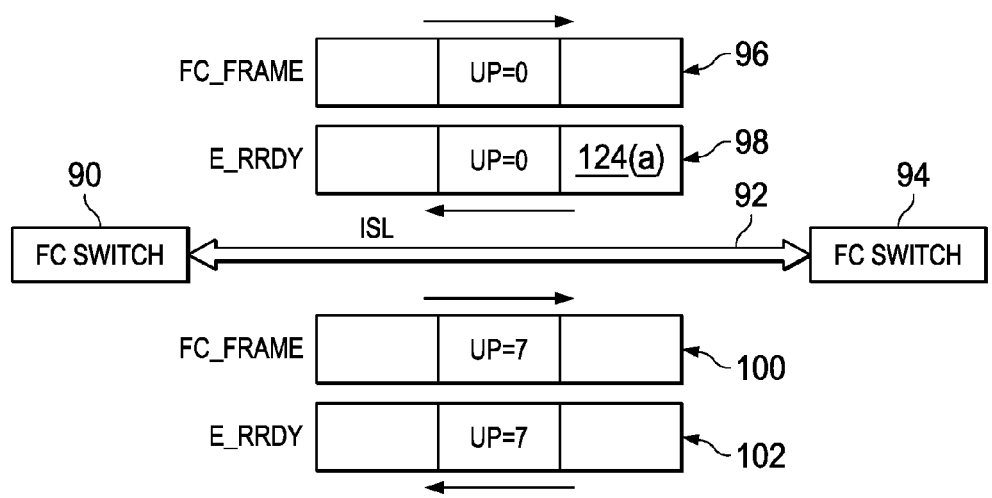

Turning now to FIGS. 3A and 3B, illustrated therein are examples of the aforementioned R_RDY mechanism (FIG. 3A) and the aforementioned ER_RDY mechanism (FIG. 3B). Referring first to FIG. 3A, assuming the first FC switch 90 transmits an FC Frame 110 with any UP to the second FC switch 94 via the ISL 96, the FC switch 94 will return an R_RDY frame 112 indicating available buffer credits to the FC switch 92 via the ISL 96. In accordance with features of R_RDY, the frame 112 is irrespective of the priority of frame credits.

Referring now to FIG. 3B, assuming a first FC switch 90 transmits an FC Frame 92 to a second FC switch 94 via an ISL 96, the FC switch 94 will return an ER_RDY frame 98 indicating available buffer credits to the FC switch 92 via the ISL 96. Both FC frame 92 and ER_RDY frame 98 indicate a user priority ("UP") of 0. Similarly, assuming the first FC switch 90 transmits an FC Frame 100 to the second FC switch 94 via the ISL 96, the FC switch 94 will return an ER_RDY frame 102 indicating available buffer credits to the FC switch 92 via the ISL 96. Both FC frame 100 and ER_RDY frame 102 indicate a user priority ("UP") of 7. As illustrated in FIG. 3B, using E-ERDY, buffers are maintained and credits are returned per user priority.

Figure 4:
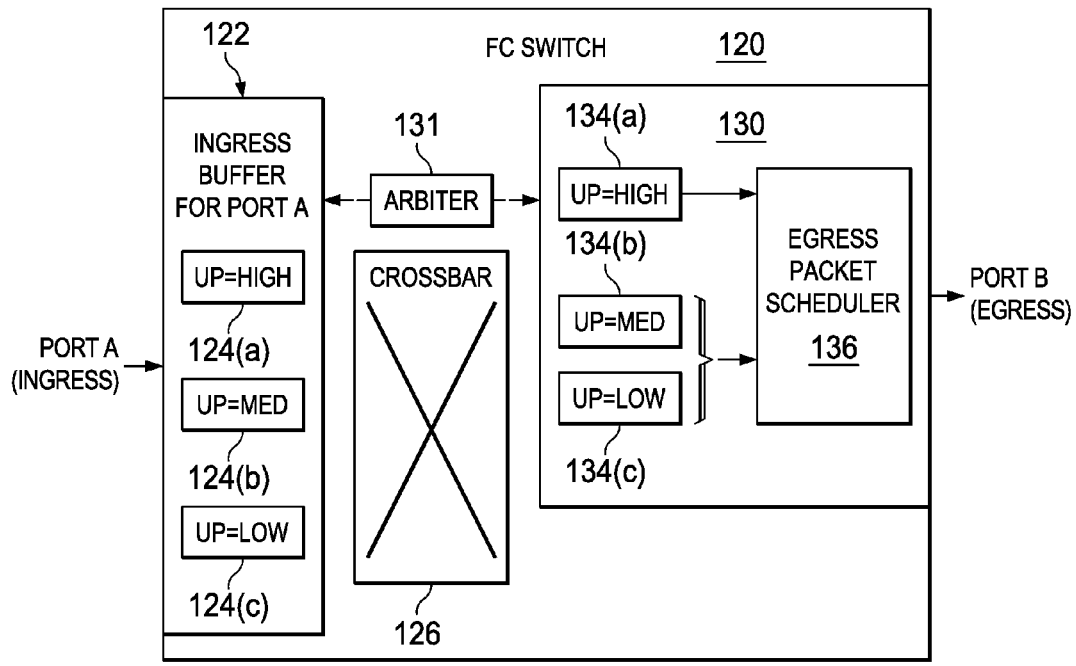
FIG. 4 is a simplified block diagram of an FC switch illustrating traffic differentiation based on user priority implemented in connection with a technique for mitigating the effects of slow drain or stuck VMs in accordance with embodiments described herein.

FIG. 4 illustrates a simplified block diagram of traffic differentiation based on user priority within an FC switch 120. As shown in FIG. 4, frames received at an ingress port ("PORT A") of the switch 120 is received by an ingress buffer 122 where they queued in one of a several virtual output queues ("VOQs) according to the UP of the traffic. For example, frames having a UP=HIGH are queued in a VOQ 124(a), frames having a UP=MED are queued in a VOQ 124(b), and frames having a UP=LOW are queued in a VOQ 124(c). A crossbar 126 is provided for connecting traffic received at the ingress buffer 122 with an egress buffer 130 connected to an egress port ("PORT B"). An arbitration mechanism, or arbiter, 131, decides which VOQ 124(a)-124(c) of the ingress port can transmit frames through the crossbar to the corresponding queue on the output port.

Egress buffer 130 also includes queues 134(a)-134(c) for each of the traffic priorities, respectively. An egress packet scheduler 136 schedules packets from the queues 134(a)-134(c) and applies strict priority to UP=HIGH traffic from queue 134(a) and applies DWRR scheduling to UP=MED and UP=LOW traffic from queue 134(b), 134(c), with the UP=MED traffic having a higher weighted priority than UP=LOW traffic.

Figure 5:
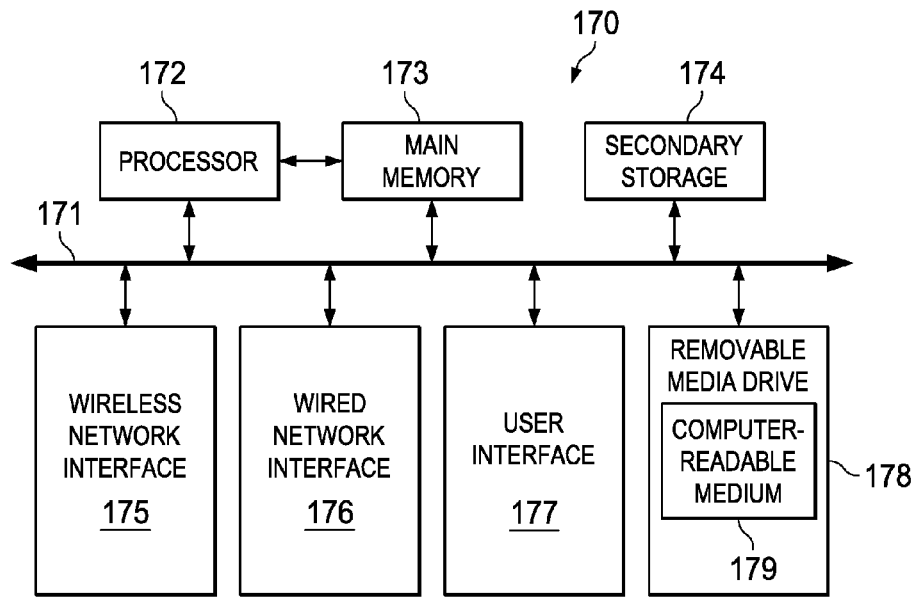
FIG. 5 illustrates a machine comprising an element of the FC network environment of FIG. 1A for use in implementing a technique for mitigating the effects of slow drain or stuck VMs in accordance with embodiments described herein.

Turning to FIG. 5, FIG. 5 is a simplified block diagram of an example machine (or apparatus) 170 that may be implemented as an element of a system for use in implementing a technique for enabling dynamic update of network device data models in accordance with embodiments described herein. The example machine 170 corresponds to network elements and computing devices that may be deployed in network 10, including, for example, FC switch 12. In particular, FIG. 5 illustrates a block diagram representation of an example form of a machine within which software and hardware cause machine 170 to perform any one or more of the activities or operations discussed herein. As shown in FIG. 5, machine 170 may include a processor 172, a main memory 173, secondary storage 174, a wireless network interface 175, a wired network interface 176, a user interface 177, and a removable media drive 178 including a computer-readable medium 179. A bus 171, such as a system bus and a memory bus, may provide electronic communication between processor 172 and the memory, drives, interfaces, and other components of machine 170.

Processor 172, which may also be referred to as a central processing unit ("CPU"), can include any general or special-purpose processor capable of executing machine readable instructions and performing operations on data as instructed by the machine readable instructions. Main memory 173 may be directly accessible to processor 172 for accessing machine instructions and may be in the form of random access memory ("RAM") or any type of dynamic storage (e.g., dynamic random access memory ("DRAM")). Secondary storage 174 can be any non-volatile memory such as a hard disk, which is capable of storing electronic data including executable software files. Externally stored electronic data may be provided to computer 170 through one or more removable media drives 178, which may be configured to receive any type of external media such as compact discs ("CDs"), digital video discs ("DVDs"), flash drives, external hard drives, etc.

Wireless and wired network interfaces 175 and 176 can be provided to enable electronic communication between machine 170 and other machines via networks (e.g., control plane 108, data plane 110. In one example, wireless network interface 175 could include a wireless network controller ("WNIC") with suitable transmitting and receiving components, such as transceivers, for wirelessly communicating within a network. Wired network interface 176 can enable machine 170 to physically connect to a network by a wire line such as an Ethernet cable. Both wireless and wired network interfaces 175 and 176 may be configured to facilitate communications using suitable communication protocols such as, for example, Internet Protocol Suite ("TCP/IP"). Machine 170 is shown with both wireless and wired network interfaces 175 and 176 for illustrative purposes only. While one or more wireless and hardwire interfaces may be provided in machine 170, or externally connected to machine 170, only one connection option is needed to enable connection of machine 170 to a network.

A user interface 177 may be provided in some machines to allow a user to interact with the machine 170. User interface 177 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 178 represents a drive configured to receive any type of external computer-readable media (e.g., computer-readable medium 179). Instructions embodying the activities or functions described herein may be stored on one or more external computer-readable media. Additionally, such instructions may also, or alternatively, reside at least partially within a memory element (e.g., in main memory 173 or cache memory of processor 172) of machine 170 during execution, or within a non-volatile memory element (e.g., secondary storage 174) of machine 170. Accordingly, other memory elements of machine 170 also constitute computer-readable media. Thus, "computer-readable medium" is meant to include any medium that is capable of storing instructions for execution by machine 170 that cause the machine to perform any one or more of the activities disclosed herein.

Not shown in FIG. 5 is additional hardware that may be suitably coupled to processor 172 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 170 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 170 to appropriately manage the operation of the hardware components therein.

The elements, shown and/or described with reference to machine 170, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities related to the system described herein (e.g., the steps shown in FIG. 2) may be implemented in software in, for example, FC switches 12, 90, 94, and 120. In some embodiments, this software could be received or downloaded from a web server, provided on computer-readable media, or configured by a manufacturer of a particular element in order to provide this system for implementing autonomic LISP for enabling a secure hybrid cloud extension in accordance with features of embodiments described herein. In some embodiments, one or more of these features may be implemented in hardware, provided external to these elements, or consolidated in any appropriate manner to achieve the intended functionality.

In one example implementation, FC switches 12, 90, 94, 120 are network devices or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 173, secondary storage 174, computer-readable medium 179) can store data used for the operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 172) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of network 10 may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system as shown in the FIGURES and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   detecting that one packet of a traffic flow comprising a plurality of packets is timeout dropped at an egress port;
   detecting a destination identifier ("DID") of the timeout dropped packet; and
   withdrawing a device identified by the detected DID from an FC zone to which it is assigned and reactivating the FC zone.

2. The method of claim 1 further comprising, if the traffic flow is experiencing high wait times at the egress port:
   detecting the DID of the traffic flow; and
   reducing a priority of the FC zone to which the detected DID is assigned and reactivating the FC zone.

3. The method of claim 2, wherein the identified device is deemed a slow device.

4. The method of claim 2 further comprising, if the traffic flow is not experiencing higher wait times at the egress port:
   determining whether the identified device was previously deemed a slow device; and
   if the identified device was previously deemed a slow device, upgrading the priority of the FC zone to an original value and reactivating the FC zone.

5. The method of claim 1, wherein the identified device is deemed a stuck device.

6. The method of claim 1, wherein the identified device comprises a virtual machine hosted on the server.

7. The method of claim 1, wherein the device is identified by the DID and a proprietary tag in an FC header of the traffic flow.

8. One or more non-transitory tangible media that includes code for execution and when executed by a processor is operable to perform operations comprising:
   detecting that one packet of a traffic flow comprising a plurality of packets is timeout dropped at an egress port;
   detecting a destination identifier ("DID") of the timeout dropped packet; and
   withdrawing a device identified by the detected DID from an FC zone to which it is assigned and reactivating the FC zone.

9. The media of claim 8, wherein the operations further comprise, if the traffic flow is experiencing high wait times at the egress port:
   detecting the DID of the traffic flow; and
   reducing a priority of the FC zone to which the detected DID is assigned and reactivating the FC zone.

10. The media of claim 9, wherein the identified device is deemed a slow device.

11. The media of claim 9, wherein the operations further comprise, if the traffic flow is not experiencing higher wait times at the egress port:
    determining whether the identified device was previously deemed a slow device; and
    if the identified device was previously deemed a slow device, upgrading the priority of the FC zone to an original value and reactivating the FC zone.

12. The media of claim 8, wherein the identified device is deemed a stuck device.

13. The media of claim 8, wherein the identified device comprises a virtual machine hosted on the server.

14. The media of claim 8, wherein the device is identified by the DID and a proprietary tag in an FC header of the traffic flow.

15. An apparatus comprising:
    a memory element configured to store data; and
    a processor operable to execute instructions associated with the data;
    wherein the apparatus is configured for:
    detecting that one packet of a traffic flow comprising a plurality of packets is timeout dropped at an egress port;

detecting a destination identifier ("DID") of the timeout dropped packet; and withdrawing a device identified by the detected DID from an FC zone to which it is assigned and reactivating the FC zone.

16. The apparatus of claim 15, wherein the apparatus is further configured for, if the traffic flow is experiencing high wait times at the egress port:

detecting the DID of the traffic flow; and reducing a priority of the FC zone to which the detected DID is assigned and reactivating the FC zone.

17. The apparatus of claim 16, wherein the identified device is deemed a stuck device.

18. The apparatus of claim 15, wherein the identified device is deemed a slow device.

19. The apparatus of claim 15, wherein the apparatus is further configured for, if the traffic flow is not experiencing higher wait times at the egress port:

determining whether the identified device was previously deemed a slow device; and if the identified device was previously deemed a slow device, upgrading the priority of the FC zone to an original value and reactivating the FC zone.

20. The apparatus of claim 15, wherein the device is identified by the DID and a proprietary tag in an FC header of the traffic flow.

* * * * *